United States Patent
Bean et al.

(10) Patent No.: US 6,813,636 B1
(45) Date of Patent: Nov. 2, 2004

(54) METHOD AND APPARATUS FOR ROUTING A TRANSACTION WITHIN A NETWORK ENVIRONMENT

(75) Inventors: Timothy Bean, Pleasanton, CA (US); Kevin McPartlan, Saratoga, CA (US)

(73) Assignee: Aspect Communications Corporation, San Jose, CA (US)

(*) Notice: Subject to any disclaimer, the term of this patent is extended or adjusted under 35 U.S.C. 154(b) by 0 days.

(21) Appl. No.: 09/259,981

(22) Filed: Mar. 1, 1999

(51) Int. Cl.[7] .................... G06F 15/173; H04M 3/00
(52) U.S. Cl. ............... 709/226; 709/244; 379/265.12; 379/266.01
(58) Field of Search .................... 709/238, 244, 709/223, 229, 202, 242, 226; 707/9, 10, 100, 102; 705/26; 379/265.02, 265.11, 265.12, 266.01

(56) References Cited

U.S. PATENT DOCUMENTS

| | | | | |
|---|---|---|---|---|
| 5,274,700 A | * | 12/1993 | Gechter et al. | 379/265.11 |
| 5,825,869 A | * | 10/1998 | Brooks et al. | 379/265.12 |
| 5,844,982 A | * | 12/1998 | Knitl | 379/265.11 |
| 5,903,877 A | * | 5/1999 | Berkowitz et al. | 705/26 |
| 5,915,012 A | * | 6/1999 | Miloslavsky | 379/265.02 |
| 5,991,843 A | * | 11/1999 | Porterfield et al. | 710/107 |
| 6,058,267 A | * | 5/2000 | Kanai et al. | 395/200 |
| 6,058,435 A | * | 5/2000 | Sassin et al. | 379/365.12 |
| 6,108,711 A | * | 8/2000 | Beck et al. | 709/242 |
| 6,125,391 A | * | 9/2000 | Meltzer et al. | 709/223 |
| 6,141,328 A | * | 10/2000 | Nabkel et al. | 379/266.01 |
| 6,243,737 B1 | * | 6/2001 | Flanagan et al. | 709/202 |
| 6,256,620 B1 | * | 7/2001 | Jawahar et al. | 709/203 |
| 6,282,656 B1 | * | 8/2001 | Wang | 713/182 |
| 6,295,548 B1 | * | 9/2001 | Klein et al. | 707/10 |
| 6,449,646 B1 | * | 9/2002 | Sikora et al. | 709/226 |

* cited by examiner

*Primary Examiner*—Patrice Winder
(74) *Attorney, Agent, or Firm*—Blakely Sokoloff Taylor & Zafman LLP

(57) ABSTRACT

A method and apparatus for routing a transaction. Initially, a resource is identified which is capable of servicing a transaction based upon resource data indicative of the capabilities of resources associated with a transactional processing system and a transaction request indicative of a request associated with the transaction. Upon identifying the resource capable of servicing the transaction, the transaction is supplied to the identified resource.

37 Claims, 9 Drawing Sheets

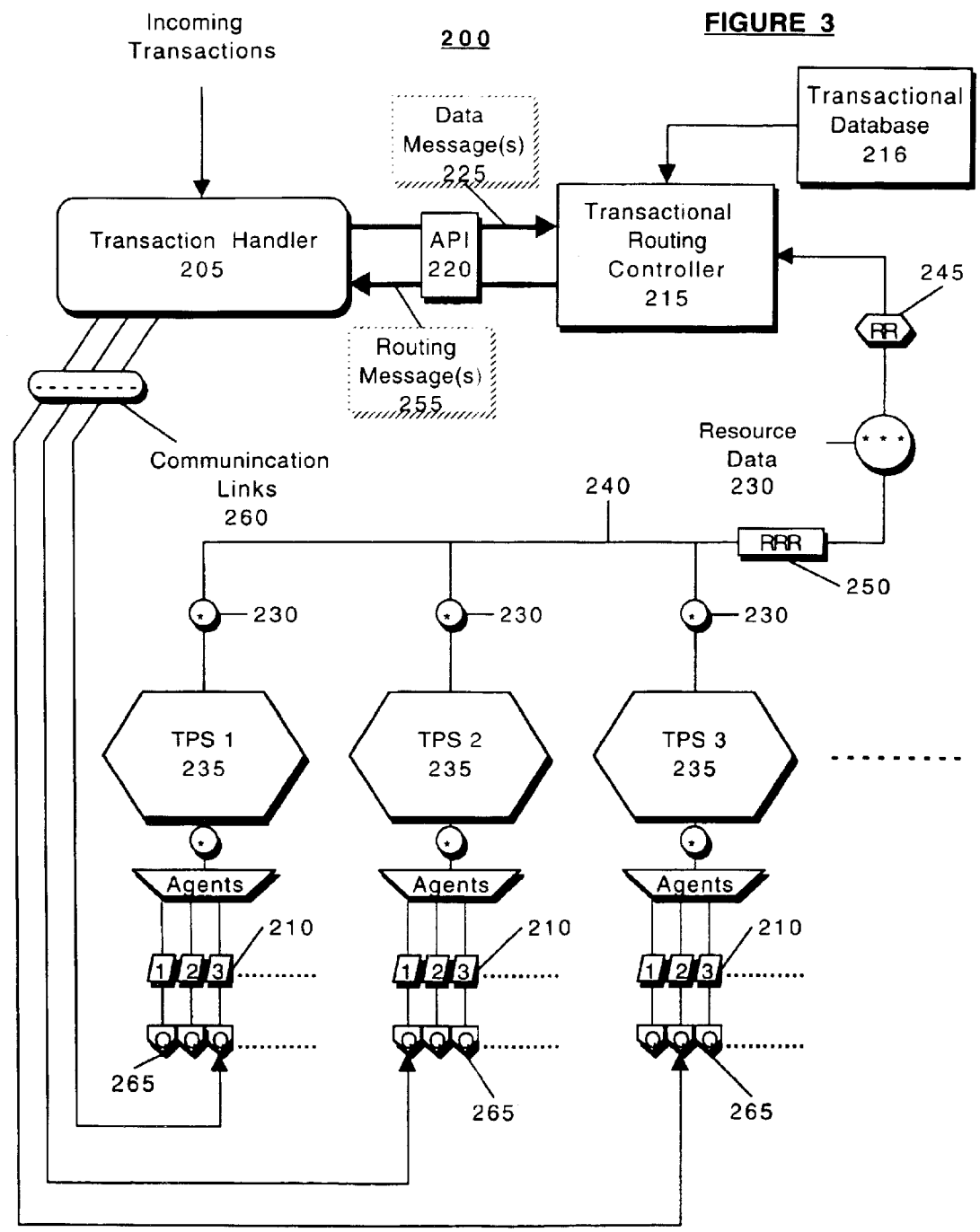

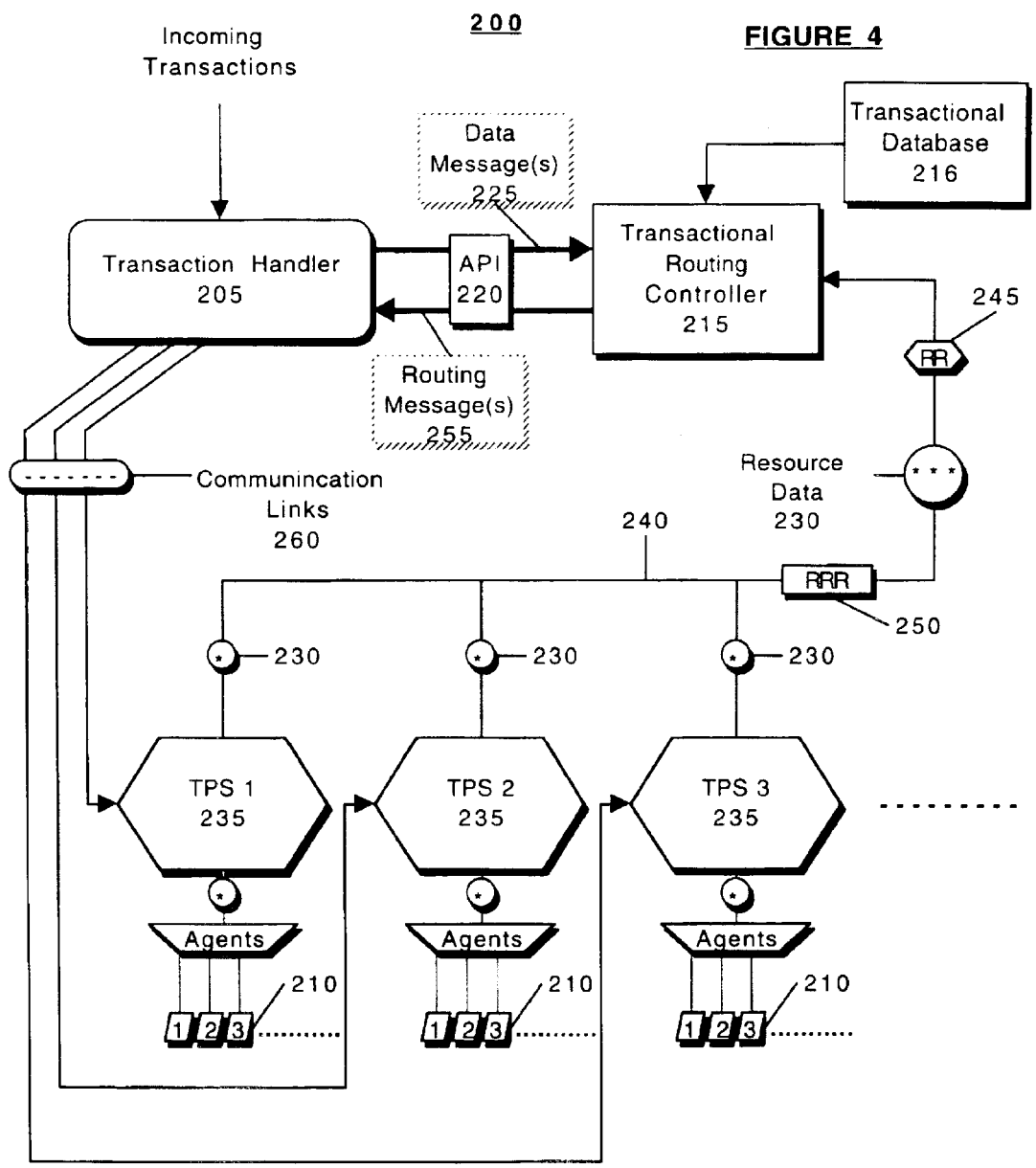

METHOD AND APPARATUS FOR ROUTING A TRANSACTION WITHIN A NETWORK ENVIRONMENT

FIELD OF THE INVENTION

The present invention relates to routing transactions within a network environment. More specifically, the present invention relates to the routing of transactions within a network environment using a virtual transactional processing center.

BACKGROUND

Transaction processing systems (TPS), such as, for example, automatic call distributors (ACDs), are typically used in transactional service systems to provide for the automatic routing of incoming transactions, such as telephone calls or other transactions, to an appropriate or select destination based upon information associated with the incoming transaction.

Currently, transactional service systems, which may, for example, comprise a series of ACDs interconnected through a series of communication links between the respective ACDs, along with a central processing office, have limited resources with respect to the efficient routing of transactions within the transactional service system.

In an exemplary prior art transactional service system 100, as illustrated in FIG. 1, an incoming transaction 102 (e.g., phone call) is received by a central processing office 104 that identifies the request associated with the incoming transaction 102 and directs the incoming transaction 102 to an ACD 106 designated to service such a transaction 102. Accordingly, the transaction 102 is routed to the selected ACD 106 (original ACD) for eventual servicing by a qualified transaction agent 108 associated with the selected ACD 106. The transaction agents 108 associated with a particular ACD 106 may not be immediately available to service the transaction 102, therefore, the transaction 102 may be placed into an associated queue 110 awaiting service by the transaction agents 108.

In order to ensure that the transaction 102 does not remain within the queue 110 for an unacceptable service period, the transactional service system 100 may implement a specified quality of service (QoS) parameter. The quality of service parameter assists in monitoring the service period by essentially time stamping or time tracking the incoming transaction 102 and comparing the time stamp against an acceptable or standard service period. Accordingly, if the in-waiting service period (i.e., time period which the transaction waits until actual servicing) is within an acceptable range, as compared to the acceptable service period, the transaction 102 remains in the queue 110 to await service by a transaction agent 108 associated with the particular ACD 106 containing the queue 110. Otherwise, if the in-waiting service period violates an acceptable range, as compared to the acceptable service period, the transaction is typically transferred to another ACD 112 (transfer ACD), via the communication link 114, in order to be serviced by another transaction agent 118 associated with the transfer ACD 112.

Likewise, the transaction agents 118 associated with the transfer ACD 112 may not be immediately available to service the transaction 102, therefore, the transaction 102 may be placed into a second queue 116, associated with the transfer ACD 112, to await service by a transaction agent 118. Accordingly, the transaction 102 placed into the transfer ACD queue 116 is still awaiting service by a transaction agent 118, while the customer or originator of the transaction 102 waits to speak or interact with the next available transaction agent 118. Ideally, a transaction agent 118 associated with the transfer ACD 112 is able to service the transaction 102 within the desired acceptable service period.

Provided a qualified transaction agent 118 associated with the transfer ACD 112 is able to service the transaction 102, two separate communication links are necessary to support the servicing of the transaction 102, a first communication link from the central processing office 104 to the original ACD 106, and a second communication link from the original ACD 106 to the transfer ACD 112.

If a qualified transaction agent 118 associated with the transfer ACD 116 is unable to service the transaction 102, the transaction 102 may have to be sent back to the original ACD 106 which originally received the transaction 102. As a result, three separate communication links would be necessary to support the servicing of this transaction 102. The three communication links would consist of a first communication link from the central processing office 104 to the original ACD 106, a second communication link from the original ACD 106 to the transfer ACD 112, and a third communication link from the transfer ACD 112 back to the original ACD 106. This triple routing over communication link 114 is sometimes referred to as a "trombone".

One solution that has been offered in response to such redundant multiple routing problems is the employment of a transfer connect service. The transfer service allows for the reduction of redundant multiple routing problems by eliminating the redundant communications lines and providing the transaction to the final selected service location in response to a request generated by the transactional service system 100. For instance, once the final selected service location is determined, the transactional service system 100 sends a request to the central processing office 104 to route the communications line directly from the central processing office 104 to the final selected service location, if possible. This solution provides an "after-the-fact" solution to the problem of redundant multiple routing, which in turn requires additional service costs the operator of the transactional service system 100. The additional costs are not only in terms of monetary costs to implement such a service, but also in terms of resources being expended to initially support the usage of unnecessary communication lines in the first place.

As illustrated by the above transaction routing examples, a standard transaction serviced by the typical transactional service system may require excessive system resources or other costs to be expended in response to the routing of a transaction. As such, the typical transactional service system may suffer from the inefficient routing of transactions within the system. This inefficient routing of transactions within transactional service systems wastes system resources and results in increased costs associated with operating the system. As previously illustrated, the transaction can be subject to multiple transfers between ACDs which costs the operator of such transactional service systems both time and money. As such, a transaction which has been subjected to multiple routings between the ACDs may be forced to the next available transaction agent in order to service the transaction within a particular service period regardless of whether the particular agent has the proper qualifications to handle the transaction.

SUMMARY OF THE INVENTION

An embodiment of the present invention provides for a method and apparatus for routing a transaction. Initially, a resource is identified which is capable of servicing a transaction based upon resource data indicative of the capabilities of resources associated with a transactional processing system and a transaction request indicative of a request associated with the transaction. Upon identifying the resource capable of servicing the transaction, the transaction is supplied to the identified resource.

Another feature of the present invention provides for reserving the resource after determining the resource capable of servicing the transaction.

Yet another feature of the present invention provides for generating a routing message based upon the reservation response, the routing message indicating the identity of reserved resource.

Further, another feature of the present invention provides for supplying the transaction to the reserved resource based upon the routing message.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 3 illustrates an alternate embodiment of a transactional service system in accordance with the teachings of one embodiment of the present invention.

FIGS. 4 illustrate another alternate embodiment of a transactional service system in accordance with the teachings of one embodiment of the present invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Generally, the present invention is directed to a transactional service system capable of analyzing incoming transactions and determining available resources associated with the transactional service system, wherein select resources associated with a transactional processing system (TPS) can be reserved to service the incoming transactions. A resource may comprise, but is not limited to, transaction agent telephone/service terminals, computer telephony integration (CTI) terminals (servicing voice data and electronic mail data), computers (CPUs), data reception/processing devices, interactive voice response ports (IVR), or a variety of other devices capable of servicing a transaction.

Figure 1:
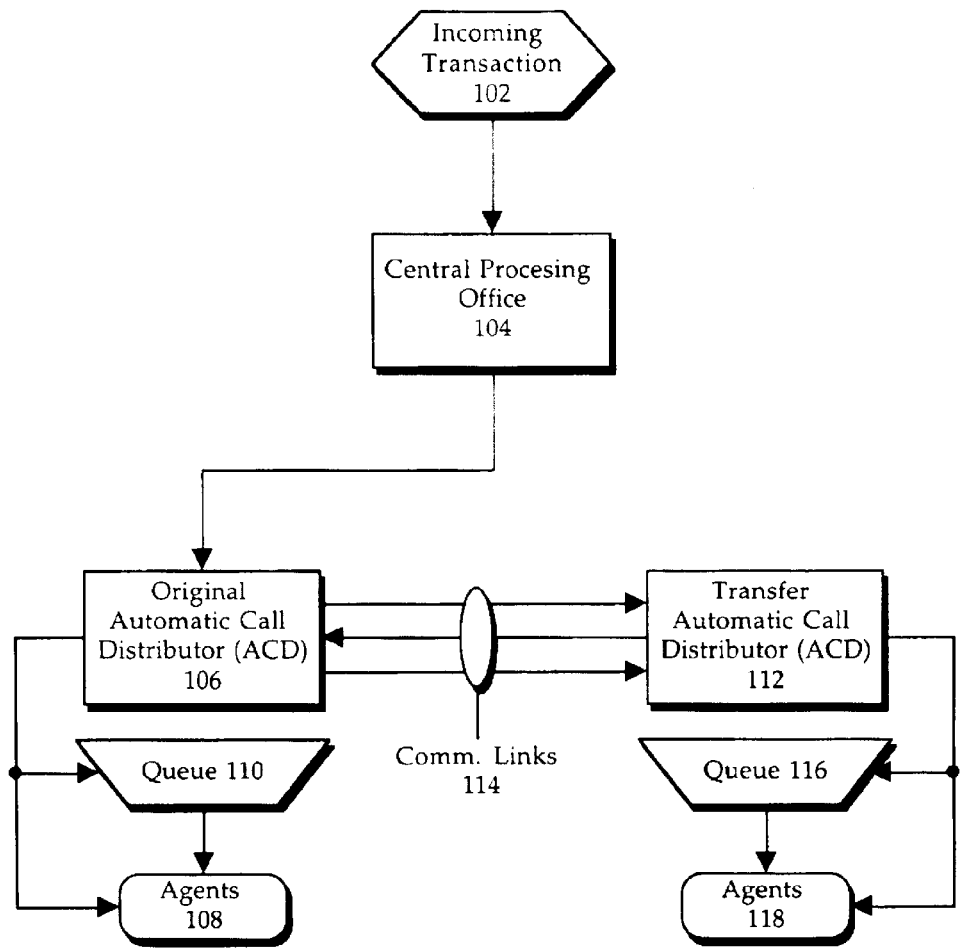
FIG. 1 illustrates a prior art embodiment of a transactional service system.
Figure 2:
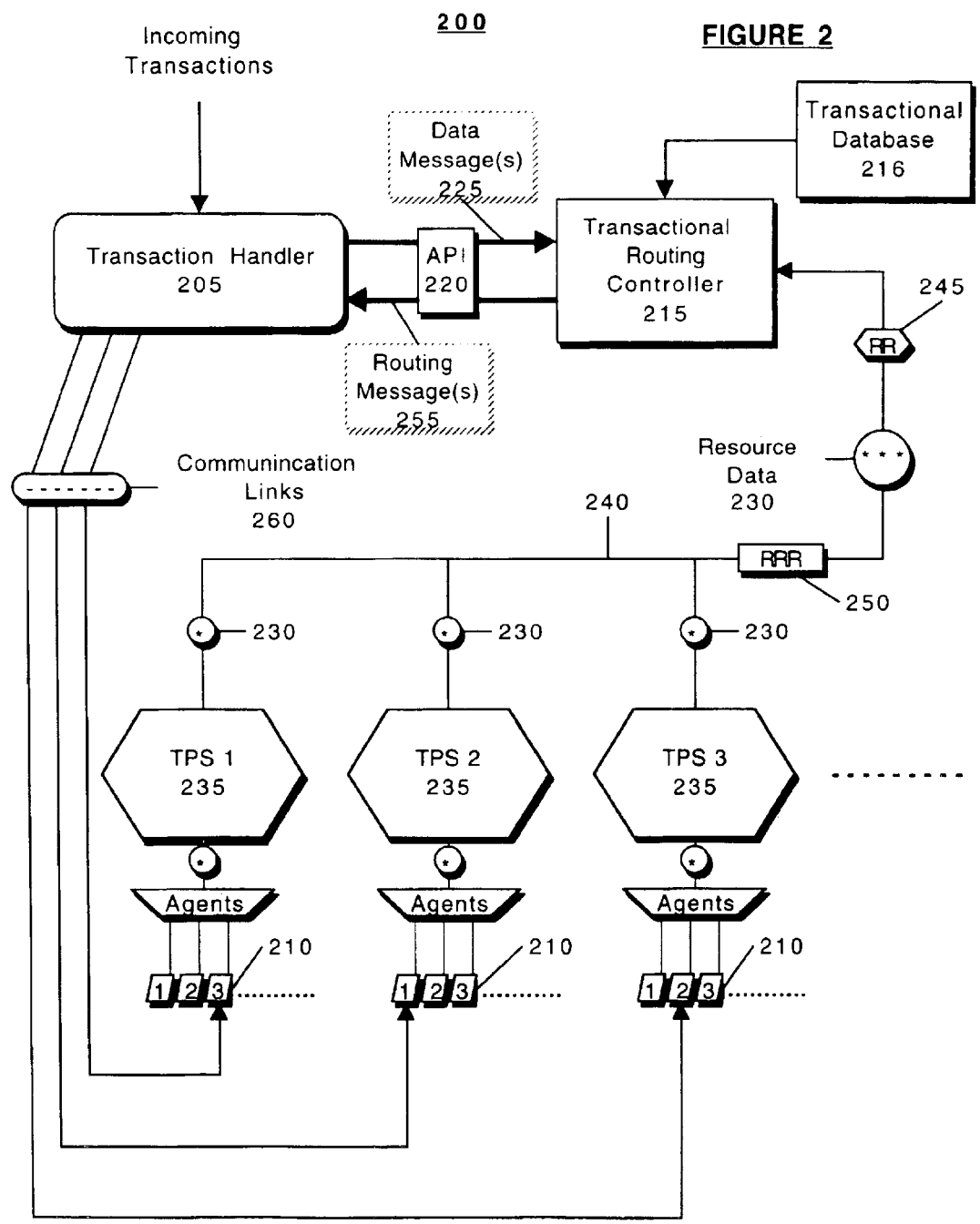
FIG. 2 illustrates an embodiment of a transactional service system in accordance with the teachings of one embodiment of the present invention.

FIG. 2 is a block diagram of an embodiment of a transactional service system 200 capable of implementing the teachings of the present invention. As illustrated in FIG. 2, the transactional service system 200 comprises a transaction handler 205 configured to receive a variety of different transactions, such as, but not limited to, voice communications (i.e., phone calls), electronic transactions (i.e., electronic mail, computer data exchanges, World Wide Web data exchanges), faxes, video sessions, or other data forms capable of conveying a service request. The transaction handler 205 may comprise, but is not limited to, a multi-data processing server, CTI server, computer device, data reception/processing device, or a variety of other devices that analyze incoming transactions and determine a transaction request or transaction identifier associated with each transaction. As such, the transaction handler 205 receives incoming transactions and determines a transaction request associated with each incoming transaction (i.e., service request associated with a transaction), in order to assist in the reservation of resources 210 within the transactional service system 200.

As mentioned above, the transaction handler 205, as illustrated in the embodiment of FIG. 2, is configured to receive a variety of different transactions, such as, but not limited to, voice communications (i.e., phone calls), electronic transactions (i.e., electronic mail, computer data exchanges, World Wide Web data exchanges), faxes, video sessions, or other data forms capable of conveying a service request.

It is understood, however, that the transactional service system 200 may contain a series of different individual transaction handlers 205, with each individual transaction handler 205 capable of handing particular types of transactions or data streams. For instance, one particular transaction handler 205 may be configured to handle or service voice communications, whereas another particular transaction handler 205 may be configured to handle or service electronic mail communications, and so on. As such, each individual transaction handler 205 may receive incoming transactions and determine a transaction request associated with each incoming transaction (i.e., service request associated with a transaction), in order to assist in the reservation of resources 210 within the transactional service system 200.

In one embodiment, the transaction handler 205 may utilize an identifier associated with each incoming transaction, such as an ANI (Automatic Number Identification), DNIS (Dialed Number Information Service), source email address, or other identifier associated with an incoming transaction, wherein the transaction handler 205 determines the transaction request associated with each incoming transaction through the associated identifier. For example, a particular DNIS associated with an incoming transaction may identify the incoming transaction as requiring technical help. As such, the transaction handler 205 could identify the transaction as requiring technical help and proceed to process the transaction accordingly.

In another embodiment, the transaction handler 205 may determine the transaction request associated with each incoming transaction through TTS (Touch Tone Selection), wherein the originator of the transaction selects the particular subject matter of interest to the originator through TTS.

Accordingly, the transaction handler 205 identifies the transaction, through TTS, and likewise proceeds to process the transaction according to the information input via the TTS.

The transaction handler 205, as illustrated in FIG. 2, is in operative communication with a transactional routing controller 215 through an application program interface (API) 220. The API 220 allows for data communication between the transaction handler 205 and the transactional routing controller 215.

The transaction handler 205 may reside at a location which is different from the location of the transactional routing controller 215. Alternately, the transaction handler 205 and transactional routing controller 215 may reside at, or share, a common location. Further, the transaction handler 205 and the transactional routing controller 215 are illustrated as two separate components, however, it is understood that the transaction handler 205 and transactional routing controller 215 could be embodied as a single integrated multi-functional device.

Upon receiving an incoming transaction, the transaction handler 205 generates data messages 225 based upon the transaction request or identifier associated with the incoming transaction. The data messages 225 are then supplied to the transactional routing controller 215. Accordingly, upon receiving the data message(s) 225 from the transaction handler 205, the transactional routing controller 215 examines the data message(s) 225 in order to determine which resources 210 (e.g., transaction agents) to reserve or allocate for a corresponding transaction in accordance with a set of operating rules associated with the transactional routing controller 215.

The transactional routing controller 215, in addition to receiving data messages 225 from the transaction handler 205, also receives resource data 230 from each transactional processing system (TPS) 235 within the transactional service system 200. Alternately, the transactional routing controller 215 may be configured to receive the resource data 230 directly from each individual resource 210 within the transactional service system 200. Each TPS 235 may be any type of transactional or switching device, such as for example an ACD (Automatic Call Distributor), that supplies a transaction to an associated resource 210, such as for example a transaction agent or computer telephony integration (CTI) terminal.

The transactional routing controller 215 may reside at a location which is different from the location of each TPS 235. Alternately, the transactional routing controller 215 and the TPSs 235 may reside at, or share, a common location. Further, the transactional routing controller 215 and the TPSs 235 are illustrated as two separate components, however, it is understood that the transactional routing controller 215 and the TPSs 235 could be embodied as a single integrated multi-functional device.

Likewise, the transaction handler 205 may reside at a location which is different from the location of each TPS 235. Alternately, the transaction handler 205 and the TPSs 235 may reside at, or share, a common location.

As illustrated, the transactional routing controller 215 is in operative communication with each TPS 235 within the transactional service system 200 through a TPS communication link 240. The TPS communication link 240 may be any communication medium which allows for the transfer of information or data between the transactional routing controller 215 and each TPS 235 within the transactional service system 200.

Each TPS 235 or resource 210 within the transactional service system 200 supplies resource data 230, relating to the real-time availability or the capabilities of resources 210 associated with each individual TPS 235, to the transactional routing controller 215. Alternately, the transactional routing controller 215 may scan each TPS 235 within the transactional service system 200 in order to determine the available resources 210 associated with each individual TPS 235. Likewise, this scanned information or resource data 230 is supplied to the transactional routing controller 215 for further processing.

In another embodiment, any changes relating to the real-time availability or capabilities of resources 210 associated with each individual TPS 235 are automatically reflected in the transactional routing controller 215.

The resource data 230 supplied to the transactional routing controller 215 from each TPS 235, or alternately each resource 210, may comprise such information as: the service capabilities associated with a resource; the current availability of resources to service incoming transactions; the qualifications of particular resource to service particular types of transactions; the minimum expected delay associated with a particular resource; specialized qualifications (i.e., excellent customer service ranking) of particular agents to service particular types of transactions; the number of transactions awaiting servicing in any transaction agents associated agent queue; identification information of resources; resource reservation time-out periods; and a variety of other desired or necessary resource information associated with any resource 210 or TPS 235 within the transactional service system 200.

As such, the transactional routing controller 215 is capable of simultaneously receiving multiple data messages 225 from the transaction handler 205, along with different resource data 230 associated with each TPS 235, indicating available resources 210 associated with each TPS 235. The operator of the transactional service system 200 may specify, filter, or format the type of information which is supplied by each TPS 235 in order to customize the usage of the transactional service system 200 for a desired application.

For instance, the operator of the transactional service system 200 may specify that only particular resource data 230 or a select combination of resource data 230 is to be supplied to the transactional routing controller 215. Further, the resource data 230 associated with each TPS 235 can be supplied to the transactional routing controller 215, or scanned from each TPS 235, or automatically reflected in the transactional routing controller 215, in real-time or at any desired time intervals depending upon the preference of the operator of the transactional service system 200.

Moreover, since the type of resource data 230 acquired from each individual TPS 235 can be selected or customized according to desired usage, there is no requirement the each individual TPS 235 within the transactional service system 200 be of the same type or manufacture. Rather, the transactional routing controller 215 may receive different types of data or data formats from a variety of different TPSs 235 within the transactional service system 200 by customizing, standardizing, or formatting the types of data received or scanned from each TPS 235. As such, the transactional routing controller 215 can be customized to accept different types of data from each TPS 235 by configuring the operation of the transactional routing controller 215 to recognize different types of data from each TPS 235 within the transactional service system 200.

As indicated in the embodiment of FIG. 2, the transactional routing controller 215 is operatively associated with a transactional database 216. The transactional database 216 contains a set of operating rules or business rules that may be used by the transactional routing controller 215 to assist in the determination of a qualified resource 210 to service a particular transaction. The operating rules are designed to assist the transactional routing controller 215 in determining which qualified resource 210 should be designated to handle a particular transaction based upon user or system defined parameters which are used to construct the operating rules maintained in the transactional database 216. As such, the operating rules may specify which qualified resource 210, out of a series of qualified resources 210, is to be employed to service a particular transaction, based upon user or system defined parameters which are embodied within the operating rules maintained in the transactional database 216.

Therefore, the transactional routing controller 215 uses the operating rules in determining which qualified resource 210 should be designated or employed to service a particular transaction based upon the user or system defined parameters which are used to construct the operating rules.

The operating rules may contains such information as: the service capabilities associated with the transactional service system 200, each individual TPS 235, or resource 210; the qualifications of particular resource 210 to service particular types of transactions; the geographic location of a particular resource 210; an identification matrix to identify the source or originator of a particular transaction; a series of specified protocols for handling particular transactions; the number of transactions that may be serviced by a resource 210; the types of transactions that may be serviced by a resource 210 and a variety of other desired or necessary resource information associated with any resource 210 or TPS 235 within the transactional service system 200.

For instance, a series of qualified resources 210 may be available to service a particular transaction, however, the operating rules within the transactional database 216 may specify, to the transactional routing controller 215, that a particular resource 210 is to be selected in lieu of another qualified resource 210. For example, a particular transaction may require the assistance of a particular resource 210 capable of servicing a particular type of transaction (e.g., customer service transaction). In response, the transactional routing controller 215 may be presented, in the present example, with two particular qualified resources 210 (R1 and R2) capable of servicing the particular transaction. The operating rules within the transactional database 216, however, may specify once qualified resource over another qualified resource 210, based upon user or system defined parameters which are embodied within the operating rules maintained in the transactional database 216.

For example, supposing a first qualified resource 210 (R1) is located at a site or location which is closer to the originator of the particular transaction, as compared to the site or location of a second qualified resource 210 (R2). Accordingly, the operating rules within the transactional database 216 may instruct the transactional routing controller 215 to select the closest qualified resource 210, which in the present example would be the first qualified resource 210 (R1), based upon user or system defined parameters embodied within the operating rules of the transactional database 216.

In another example, the transactional database 216 may maintain records which identify the originator or source of a particular transaction. Accordingly, the operating rules maintained in the transactional database 216 may specify that a particular qualified resource be assigned or reserved to service this particular transaction, or that a particular protocol be observed when servicing this transaction, based upon the status of the originator or source of a particular transaction.

In yet of another example, the operating rules of the transactional database 216 may specify that a second qualified resource 210 (R2) be used in lieu of another first qualified resource 210 (R1) provided that the number of transaction awaiting service in the first qualified resource 210 (R1) exceeds a specified transaction threshold value.

Further, in yet another example, the operating rules of the transactional database 216 may specify that a particular protocol be observed when servicing a particular type of transaction.

As illustrated by the above examples, it is envisioned that a wide variety of different types of user or system defined parameters may be employed in constructing a particular set of operating rules, wherein the particular set of operating rules used may customized to the needs of a particular user or system. Accordingly, the above examples are merely illustrative of the possible types of user or system defined parameters which can be instituted within the operating rules maintained in the transactional database 216. As such, the above examples are merely illustrative and are not meant to limit the present invention to such embodiments of the operating rules.

Further, in one embodiment, the transactional database 216 may be configured to maintain a log of the number of transaction that are currently being serviced, or waiting to be serviced, by each resource (i.e., workflow of each resource 210) contained in the transactional service system 200. As such, the operating rules may specify that the transactional routing controller 215 take the number of transaction that are currently being serviced, or waiting to be serviced, by each resource (i.e., workflow of each resource 210), into account when determining which qualified resource 210 is to be selected to service a particular transaction.

Accordingly, upon receiving resource data 230 from each individual TPS 235 within the transactional service system 200, indicating the available resources 210 associated with each TPS 235, the transactional routing controller 215 determines, in accordance with the operating rules maintained in the transactional database 216, which qualified resource 210 will be selected to service a particular incoming transaction. Since the transactional routing controller 215 receives resource data 230 from each individual TPS 235 within the transactional service system 200, the transactional routing controller 215 possesses information as to which resources 210 are available to service a particular transaction within the transactional service system 200, in addition to all general resource data 230 associated with each TPS 235.

As such, the transactional routing controller 215 possesses both the data messages 225 from the transaction handler 205 indicating the transaction request associated with each incoming transaction, in addition to the resource data 230 associated with each individual TPS 235 within the transactional service system 200 indicating the available resources 210 associated with each TPS 235. The transactional routing controller 215 examines both the transaction request (contained in the data messages 225) associated with each incoming transaction and the resource data 230 received from each individual TPS 235 in order to reserve or allocate an appropriate or qualified resource 210 to service a corresponding transaction. Accordingly, the transactional routing controller 215 determines an appropriate resource 210, in accordance with the operating rules maintained in the transactional database 216, that is capable of servicing the particular transaction based upon a correlation between the resource data 230 (e.g., available resources) and the transaction request associated with a particular transaction.

For instance, if the incoming transaction has a transaction request which corresponds to a technical type inquiry, the transaction handler 205 will generate a data message 225 indicating that the particular incoming transaction corresponds to a technical transaction type. Accordingly, the transactional routing controller 215 examines both the transaction request (contained in the data message 225) associated with the incoming transaction (i.e., technical transaction type) and the resource data 230 from each individual TPS 235 in order to determine, in accordance with the associated operating rules, an appropriate resource 210 to service the corresponding technical type transaction. As such, the transactional routing controller 215 determines which resource 210 within the transactional service system 200 possesses the qualifications to service an incoming transaction having a technical transaction type in accordance with the operating rules maintained in the transactional database 216.

The transactional routing controller 215 determines which resource 210 to reserve or assign to a transaction by using a variety of different resource determination techniques. One such technique is by a direct data comparison between the transaction request and the resource data 230 associated with each resource 210 (e.g., the service capabilities associated with a resource, the current availability of resources to service incoming transactions; the qualifications of particular resource to service particular types of transactions; the minimum expected delay associated with a particular resource; specialized qualifications (i.e., excellent customer service ranking) of particular agents to service particular types of transactions; the number of transactions awaiting servicing in any transaction agents associated agent queue; identification information of resources; resource reservation time-out periods; and a variety of other desired or necessary resource information associated with any resource 210 or TPS 235 within the transactional service system 200). Accordingly, the transactional routing controller 215 compares the resource data 230 against the transaction request of a transaction to determine the best match or correlation between the resource data 230 and the transaction request, in accordance with the operating rules maintained in the transactional database 216.

Another resource determination technique applies a resource allocation algorithm to the resource data 230 received from each TPS 235. The resource allocation algorithm determines, in accordance with the associated operating rules, which resource 210 is most appropriate to service a particular transaction based upon a correlation between the resource data 230 and transaction request associated with a particular transaction. The resource allocation algorithm applied to the resource data 230 determines a data match or correlation percentage between the resource data 230 and transaction request associated with a particular transaction, and reserves or allocates the resource 210 which satisfies the resource allocation algorithm.

Yet another resource determination technique utilizes a data correlation table. The data correlation table is divided into request data associated with the transaction request and resource data 230. The request data associated with the transaction request indicates the request (e.g., subject matter) associated with the transaction. Accordingly, the request data associated with the transaction request is compared to the resource data 230 associated with each resource 210, to determine the best match or correlation between the resource data 230 and the transaction request, in accordance with the operating rules maintained in the transactional database 216.

It is envisioned that a variety of other determination techniques may be implemented, in addition to the above techniques which are for illustrative purposes and are not intended to limit the invention to such, in order to determine the most appropriate resource 210 to service a particular transaction.

Accordingly, after determining which resource 210 is best suited or most appropriate to handle a particular incoming transaction, in accordance with the operating rules maintained in the transactional database 216, the transactional routing controller 215 generates a reservation request (RR) 245, which is provided to the TPS 235 or resource 210, in order to reserve that particular resource 210 which is most appropriate or qualified to service the corresponding transaction. Provided that the selected appropriate resource 210 is available to service the particular transaction, the TPS 235, or the individual resource 210, will generate a reservation request response (RRR) 250, in response to the reservation request (RR) 245, indicating that the resource 210 has been reserved (acknowledge signal) for the servicing of the particular corresponding transaction.

Upon receiving the reservation request response (RRR) 250 indicating that the resource 210 has been reserved (acknowledge signal), the transactional routing controller 215 generates a routing message 255 indicating that the specific resource 210, identified in the reservation request response (RRR) 250, has been reserved to service the corresponding transaction. Accordingly, the routing message 255 contains an identifier known to the to the transaction handler 205 which identifies the particular reserved resource 210. In one embodiment, the duration of a reservation for a resource 210 may have a configurable resource reservation time-out period which allows the reservation to expire after a particular time period has elapsed.

Accordingly, the routing message 255 is supplied to the transaction handler 205 which constructs a communication link 260, such as a telephone link or data link, directly to the identified reserved resource 210, thereby bypassing the associated TPS 235.

Alternately, if a reservation request response (RRR) 250 is received, in response to the reservation request (RR) 245, indicating that the selected appropriate resource 210 is unavailable to service the particular transaction, the TPS 235 or resource 210 will generate a reservation request response (RRR) 250 indicating that the resource 210 has not been reserved (non-acknowledge signal).

Accordingly, if the transactional routing controller receives a reservation request response (RRR) 250 indicating that the resource 210 has not been reserved (non-acknowledge signal), the transactional routing controller 215 proceeds to determine an alternate resource 210 which is suited or most appropriate to handle the particular incoming transaction.

Upon determining an alternate resource 210, the transactional routing controller 215 generates a reservation request (RR) 245 in order to reserve that particular alternate resource 210 which is appropriate to service the corresponding transaction. Provided that the selected appropriate resource 210 is available to service the particular transaction, the TPS 235 or resource 210 will generate a reservation request response (RRR) 250 indicating that the alternate resource 210 has been reserved (acknowledge signal) in order to service the particular corresponding transaction.

Likewise, upon receiving reservation request response (RRR) 250 indicating that the alternate resource 210 has been reserved (acknowledge signal), the transactional routing controller 215 generates a routing message(s) 255 indicating that the specific alternate resource 210, identified in the reservation request response (RRR) 250, has been reserved to service the corresponding transaction. Accordingly, the routing message 255 is supplied to the transaction handler 205 which constructs a communication link 260, such as a telephone link or data link, directly to the identified reserved alternate resource 210.

Otherwise, the transactional routing controller 215 may be configured to attempt to reserve another alternate resource 210, or otherwise terminate the operation and generate a failure message. As such, the transactional routing controller 215 may be configured to terminate the operation and generate a failure message after a specified number of attempts to reserve another alternate resource 210 or upon the expiration of a specified time limit.

In an alternate embodiment, as illustrated in FIG. 3, after the transactional routing controller 215 has received a reservation request response (RRR) 250 indicating that a particular resource 210 has been reserved (acknowledge signal), the transactional routing controller 215 generates a routing message 255 indicating that the specific resource 210, identified in the reservation request response (RRR) 250, has been reserved to service the corresponding transaction.

Accordingly, a routing message 255 is supplied to the transaction handler 205, in response to the reservation request response (RRR) 250, wherein the transaction handler 205 constructs a communication link 260, such as a telephone link or data link, directly to a resource queue 265 associated with the particular reserved resource 210. Upon receiving the transaction, the resource queue 265 associated with the particular reserved resource 210 supplies the transaction to the particular reserved resource 210 as the agent services the associated resource queue 265.

In another embodiment, as illustrated in FIG. 4, after the transactional routing controller 215 has received a reservation request response (RRR) 250 indicating that a particular resource 210 has been reserved (acknowledge signal), the transactional routing controller 215 generates a routing message 255 indicating that a specific resource 210 associated with a designated TPS 235, identified in the reservation request response (RRR) 250, has been reserved to service the corresponding transaction.

Accordingly, a routing message 255 is supplied to the transaction handler 205, in response to the reservation request response (RRR) 250, wherein the transaction handler 205 constructs a communication link 260, such as a telephone link or data link, directly to the TPS 235 containing the identified resource 210.

Upon receiving the transaction, the designated TPS 235 routes the transaction to the particular reserved resource 210. The transaction in this case is not supplied directly to the resource 210. As such, the TPS 235 may perform a variety of pre-processing operations of the transaction before supplying the transaction to the resource 210, if such is desired. For instance, the TPS 235 might need to perform a data operation with respect to the information contained in the transaction before supplying the transaction to the reserved resource 210. By supplying the transaction to the designated TPS 235 containing the reserved resource 210, the TPS 235 can perform a variety of desired operations on the transaction before the transaction is supplied to the reserved resource 210.

Figure 5A:
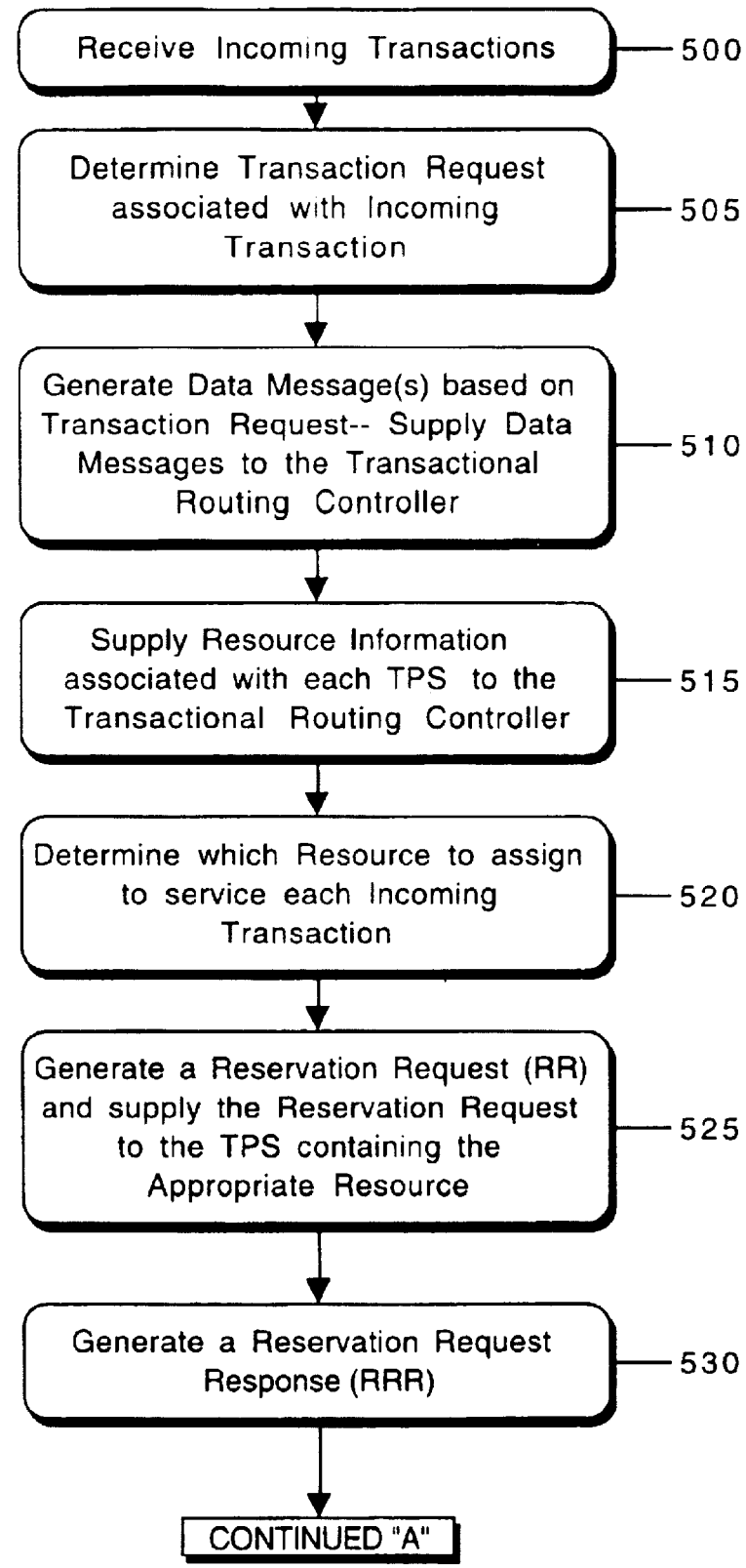
FIGS. 5A, B, and C illustrate an embodiment of the operation of the transactional service system in accordance with the teachings of one embodiment of the present invention.
Figure 5B:
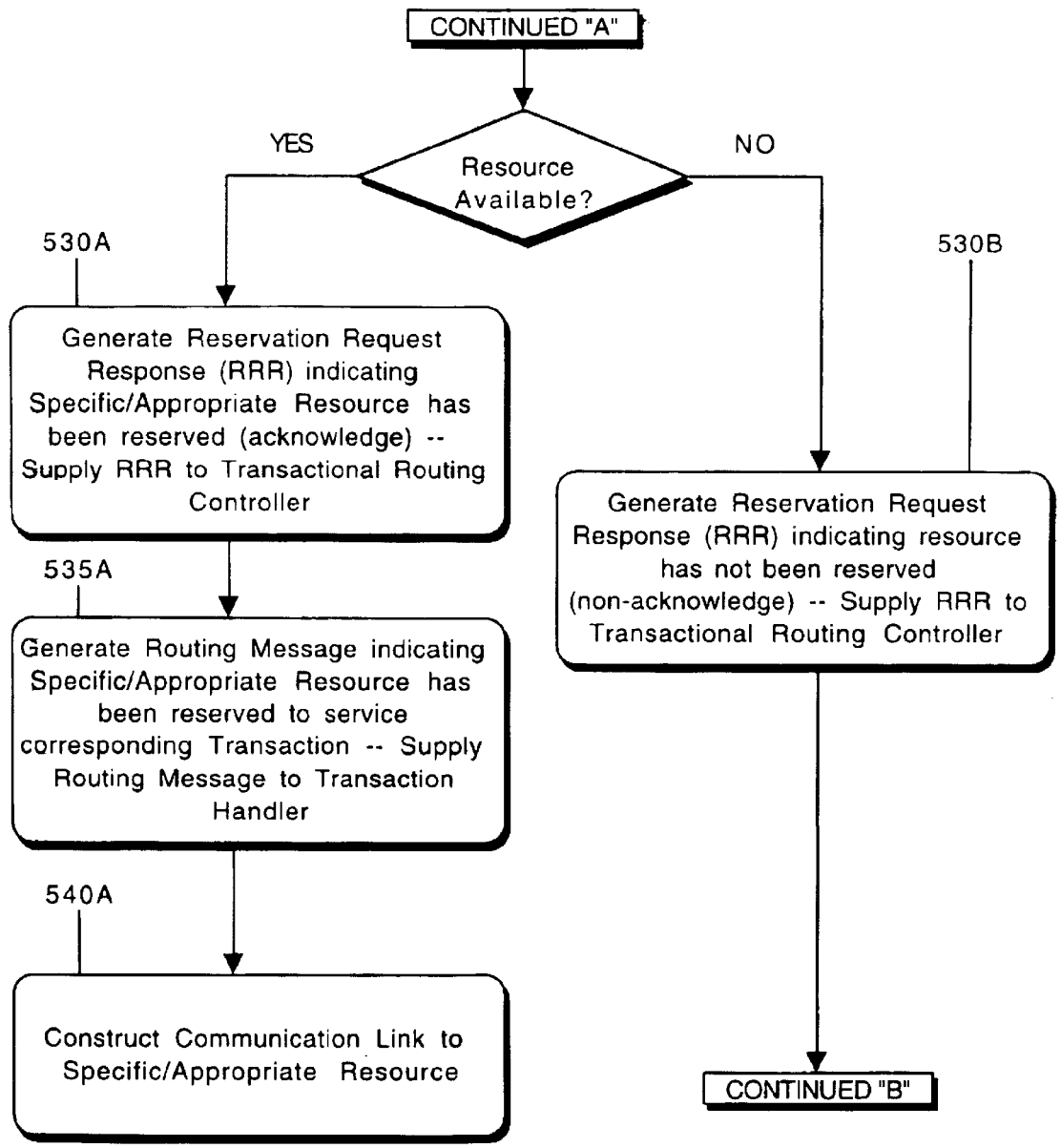
Figure 5C:
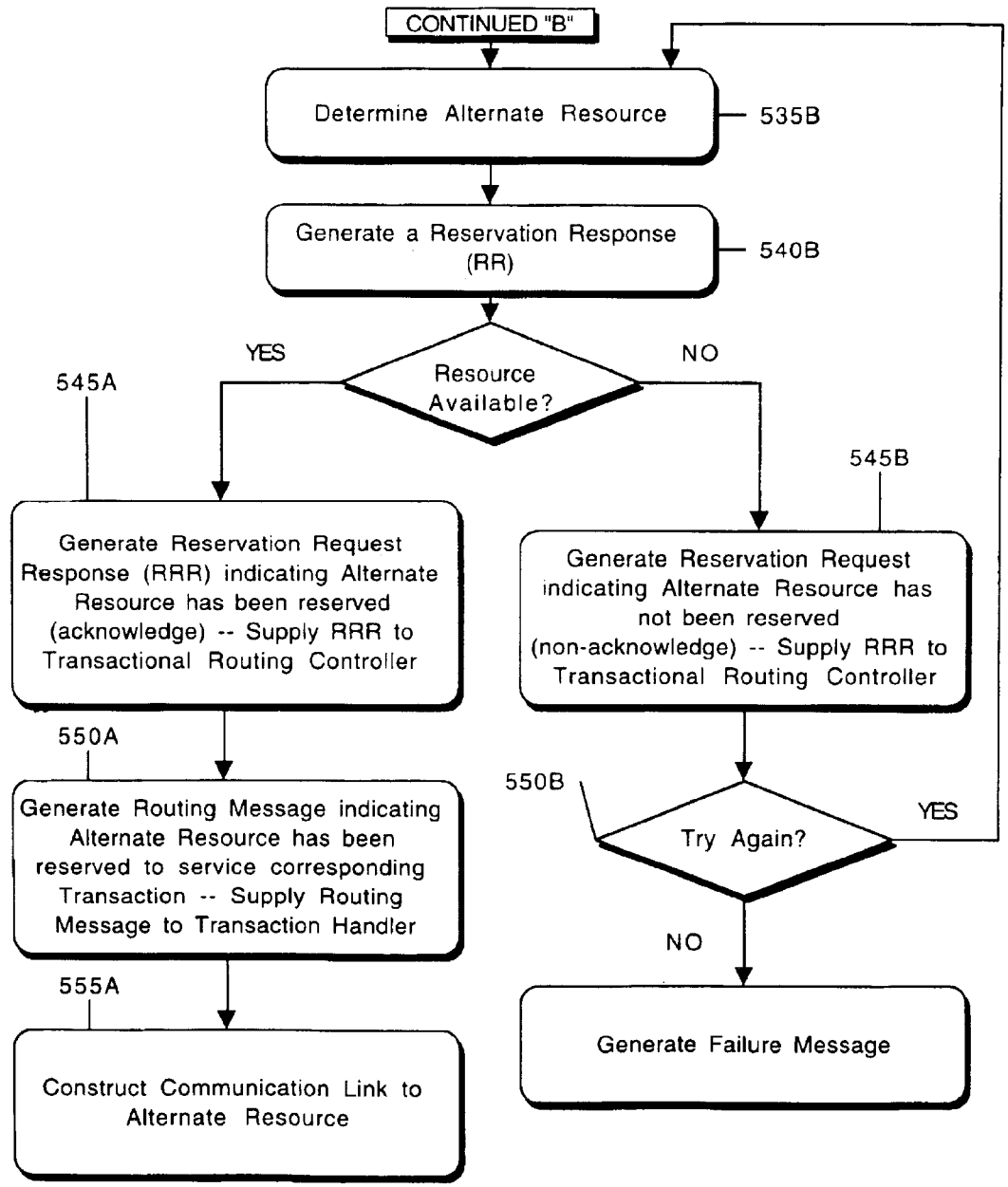

FIGS. 5A-5C illustrate, in a block flow diagram, an embodiment of the operation of the transactional service system 200. Initially, at Block 500, the transaction handler 205 receives incoming transactions, such as, but not limited to, voice communications (i.e., phone calls), electronic transactions (i.e., electronic mail, computer data exchange, World Wide Web data exchanges), faxes, video sessions, or other data forms capable of conveying a service request.

At Block 505, the transaction handler 205 determines the transaction request associated with the incoming transaction. The transaction request associated with an incoming transaction identifies the type of subject matter that the incoming transaction is directed to, for instance, the transaction request could identify the transaction as corresponding to a technical matter, sales matter, delivery matter, information matter, or any other transaction type.

In one embodiment, the transaction handler 205 may utilize an identifier associated with each incoming transaction, such as an ANI (Automatic Number Identification), DNIS (Dialed Number Information Service), source e-mail address, or other identifier associated with an incoming transaction, to determine the transaction request associated with each incoming transaction. In another embodiment, the transaction handler 205 may be configured to determine the transaction request associated with each incoming transaction through TTS (Touch Tone Selection), wherein the originator of the transaction selects the particular subject matter of interest to the originator utilizing the TTS.

At Block 510, the transaction handler 205 generates data message(s) 225, based upon the transaction request or identifier associated with each incoming transaction, which is supplied to the transactional routing controller 215. The data message(s) 225 indicates the transaction request associated with a particular incoming transaction.

As illustrated at Block 515, the transactional routing controller 215 is also supplied with resource data 230 from each TPS 235 or resource 210 within the transactional service system 200. Each TPS 235 within the transactional service system 200 may supply resource data 230 concerning the capabilities and real-time availability of resources 210 associated with each individual TPS 235 to the transactional routing controller 215.

In another embodiment, any changes relating to the real-time availability or capabilities of resources 210 associated with each individual TPS 235 are automatically reflected in the transactional routing controller 215.

The resource data 230 supplied to the transactional routing controller 215 from each TPS 235, or resource 210, may comprise information such the service capabilities associated with a resource; the current availability of resources to service incoming transactions; the qualifications of particular resource to service particular types of transactions; the minimum expected delay associated with a particular resource; specialized qualifications (i.e., excellent customer service ranking) of particular agents to service particular types of transactions; the number of transactions awaiting servicing in any transaction agents associated agent queue; identification information of resources; resource reservation time-out periods; and a variety of other desired or necessary resource information associated with any resource 210 or TPS 235 within the transactional service system 200.

At Block 520, the transactional routing controller 215 determines which resource 210 to assign to a particular incoming transaction in accordance with a set of operating rules that assist in determining which qualified resource 210 should handle a particular transaction. The operating rules are designed to assist the transactional routing controller 215 in determining which qualified resource 210 should be designated to handle a particular transaction based upon user or system defined parameters which are used to construct the operating rules. As such, the operating rules may specify which qualified resource 210, out of a series of qualified resources 210, is to be employed to service a particular transaction, based upon user or system defined parameters which are embodied within the operating rules.

Therefore, the transactional routing controller 215 uses the operating rules in determining which qualified resource 210 should be designated or employed to service a particular transaction based upon the user or system defined parameters which are used to construct the operating rules.

The operating rules may contains such information as: the service capabilities associated with the transactional service system 200, each individual TPS 235, or resource 210; the qualifications of particular resource 210 to service particular types of transactions; the geographic location of a particular resource 210; an identification matrix to identify the source or originator of a particular transaction; a series of specified protocols for handling particular transactions; the number of transactions that may be serviced by a resource 210; the types of transactions that may be serviced by a resource 210 and a variety of other desired or necessary resource information associated with any resource 210 or TPS 235 within the transactional service system 200.

Further, in one embodiment, a log is maintained which indicates the number of transaction that are currently being serviced, or waiting to be serviced, by each resource (i.e., workflow of each resource 210) contained in the transactional service system 200. As such, the operating rules may specify that the transactional routing controller 215 take the number of transaction that are currently being serviced, or waiting to be serviced, by each resource (i.e., workflow of each resource 210), into account when determining which qualified resource 210 is to be selected to service a particular transaction.

Since, the transactional routing controller 215 receives resource data 230 from each individual TPS 235 or resource 210 within the transactional service system 200, the transactional routing controller 215 possesses information as to service capabilities and real-time availability of each resource 210 within the transactional service system 200, in addition to all general resource information associated with each TPS 235.

As such, the transactional routing controller 215 possesses both transaction request data (contained in the data message 225 from the transaction handler 205) indicating the transaction request associated with each incoming transaction, in addition to the resource data 230 from each individual TPS 235, or resource 210, within the transactional service system 200 indicating the capabilities and real-time availability of the resources 210 associated with each TPS 235.

Accordingly, the transactional routing controller examines both the transaction request associated with each incoming transaction and the resource data 230 received from each individual TPS 235, or resource 210, in order to reserve or allocate the appropriate resource 210 to a corresponding transaction. Accordingly, the transactional routing controller 215 determines an appropriate resource 210, in accordance with the set of operating rules, capable of servicing the particular transaction based upon a correlation between the resource data 230 and the transaction request associated with a particular transaction.

For instance, if the incoming transaction has a transaction request which corresponds to a sales inquiry, the transaction handler 205 generates a data message(s) 225 indicating that the particular incoming transaction corresponds to a sales transaction type. Accordingly, the transactional routing controller 215 examines both the transaction request (contained in the data message 225) associated with each incoming transaction (i.e., sales transaction type) and the resource data 230 received from each individual TPS 235, or resource 210, in order to determine, in accordance with the set of operating rules, the appropriate resource 210 to service the corresponding transaction. As such, the transactional routing controller 215 determines which resource 210 within the transactional service system 200 possesses the qualifications to service the incoming transaction having a sales transaction type. It is understood that an incoming transaction may have multiple transaction requests, wherein the transactional routing controller 215 determines which resource 210 would be most appropriate to service such a transaction.

At Block 525, upon determining the appropriate resource 210 to service a corresponding transaction, the transactional routing controller 215 generates a reservation request (RR) 245 in order to reserve that particular appropriate resource 210 to service the corresponding transaction. The reservation request (RR) 245, which identifies the particular appropriate resource 210, is supplied to the TPS 235 in order to reserve the particular appropriate resource 210.

At Block 530, after the reservation request (RR) 245 has been supplied to the TPS 235, thereby identifying the particular appropriate resource 210 to the TPS 235, the TPS 235, or the individual resource 210, generates a reservation request response (RRR) 250. The reservation request response (RRR) 250 indicating whether or not the particular appropriate resource 210 has been reserved to service the particular corresponding transaction.

Provided that the selected appropriate resource 210 is available to service the particular transaction, as illustrated at Block 530A, the TPS 235 or resource 210 will generate a reservation request response (RRR) 250 indicating that the resource 210 has been reserved (acknowledge signal) to service the particular corresponding transaction. Accordingly, the reservation request response (RRR) 250 indicating that the resource has been reserved (acknowledge signal) is supplied to the transactional routing controller 215.

In response to the reservation request response (RRR) 250, indicating that the resource 210 has been reserved (acknowledge signal), as illustrated at Block 535A, the transactional routing controller 215 generates a routing message 255, which is supplied to the transaction handler 205, indicating that the specific resource 210, identified in the reservation request response (RRR) 250, has been reserved to service the corresponding transaction.

Accordingly, at Block 540A, in response to the routing message 255, the transaction handler 205 constructs a communication link 206, such as a telephone link or data link, directly to the identified reserved resource 210.

Alternately, as illustrated at Block 530B, if the selected appropriate resource 210 is not available to service the particular transaction, a reservation request response (RRR) 250 indicating that the resource 210 has not been reserved (non-acknowledge signal) is generated and supplied to the transactional routing controller 215.

Accordingly, as illustrated at Block 535B, if the transactional routing controller 215 receives a reservation request response (RRR) 250 indicating that the resource 210 has not been reserved (non-acknowledge signal), the transactional routing controller 215 proceeds to determine an alternate resource 210 which is best suited or most appropriate to handle the particular incoming transaction.

Upon determining an alternate resource 210, the transactional routing controller 215 generates a reservation request (RR) 245 in order to reserve that particular alternate resource 210 to service the corresponding transaction, as illustrated at Block 540B.

Provided that the selected alternate resource 210 is available to service the particular transaction, as illustrated at Block 545A, the TPS 235, or the individual resource 210, will generate a reservation request response (RRR) 250 indicating that the alternate resource 210 has been reserved (acknowledge signal) to service the particular corresponding transaction. Accordingly, the reservation request response (RRR) 250, indicating that the alternate resource 210 has been reserved (acknowledge signal), is supplied to the transactional routing controller 215.

Upon receiving reservation request response (RRR) 250 indicating that the alternate resource has been reserved (acknowledge signal), as shown by Block 550A, the transactional routing controller 215 generates a routing message 255, that is supplied to the transaction handler 205, indicating that the specific alternate resource 210, indicated in the reservation request response (RRR) 250, has been reserved to service the corresponding transaction.

Accordingly, at Block 555A, in response to the routing message 255, the transaction handler 205 constructs a communication link 260, such as a telephone link or data link, directly to the identified reserved alternate resource 210.

Otherwise, as illustrated by Block 545B, if the selected appropriate resource 210 is not available to service the particular transaction, a reservation request response (RRR) 250 indicating that the resource 210 has not been reserved (non-acknowledge signal) is generated and supplied to the transactional routing controller 215.

Accordingly, as illustrated by Block 550B, the transactional routing controller 215 will attempt to reserve another alternate resource 210, returning to Block 535B, or otherwise terminate the process and generate a failure message. As such, the transactional routing controller 215 may be configured to terminate the operation and generate a failure message after a specified number of attempts to reserve another alternate resource 210 or upon the expiration of a specified time limit.

Figure 6:
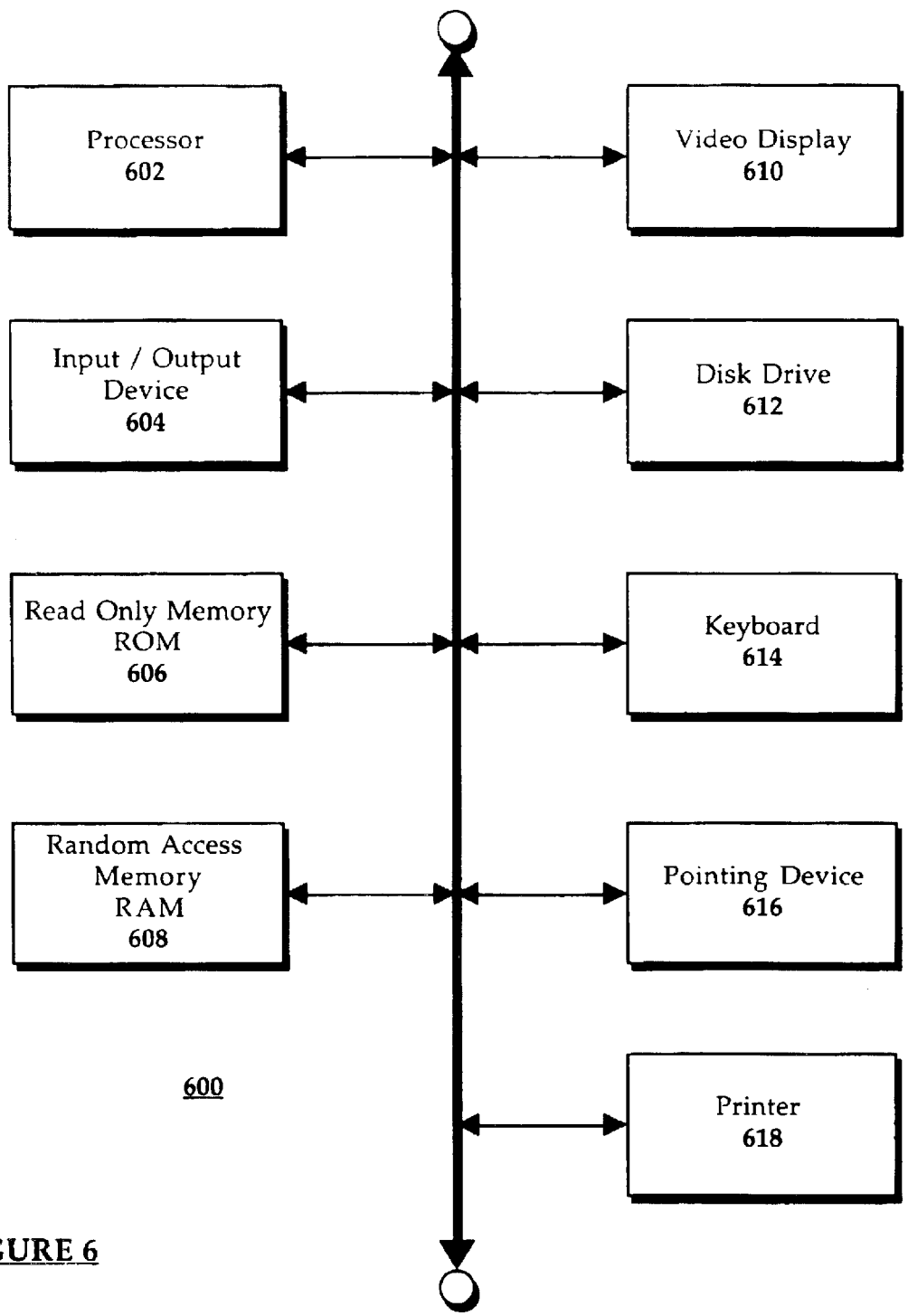
FIG. 6 illustrates an embodiment of a computer system that can be used with the present invention in accordance with the teachings of one embodiment of the present invention.

FIG. 6 illustrates an embodiment of a machine in the exemplary form of a computer system that can be used with the present invention. The various components shown in FIG. 6 are provided by way of example. Certain components of the computer in FIG. 6 can be deleted from the addressing system for a particular implementation of the invention. The computer shown in FIG. 6 may be any type of computer including a general purpose computer.

FIG. 6 illustrates a system bus 600 to which various components are coupled. A processor 602 performs the processing tasks required by the computer. Processor 602 may be any type of processing device capable of implementing the steps necessary to perform the addressing and delivery operations discussed above. An input/output (I/O) device 604 is coupled to bus 600 and provides a mechanism for communicating with other devices coupled to the computer. A read-only memory (ROM) 606 and a random access memory (RAM) 608 are coupled to bus 600 and provide a storage mechanism for various data and information used by the computer. Although ROM 606 and RAM 608 are shown coupled to bus 600, in alternate embodiments, ROM 606 and RAM 608 are coupled directly to processor 602 or are coupled to a dedicated memory bus (not shown).

A video display 610 is coupled to bus 600 and displays various information and data to the user of the computer. A disk drive 612 is coupled to bus 600 and provides for the long-term mass storage of information. Disk drive 612 may be used to store various profile data sets and other data generated by and used by the addressing and delivery system. A keyboard 614 and pointing device 616 are also coupled to bus 600 and provide mechanisms for entering information and commands to the computer. A printer 618 is coupled to bus 600 and is capable of creating a hard-copy of information generated by or used by the computer.

Figure 7:
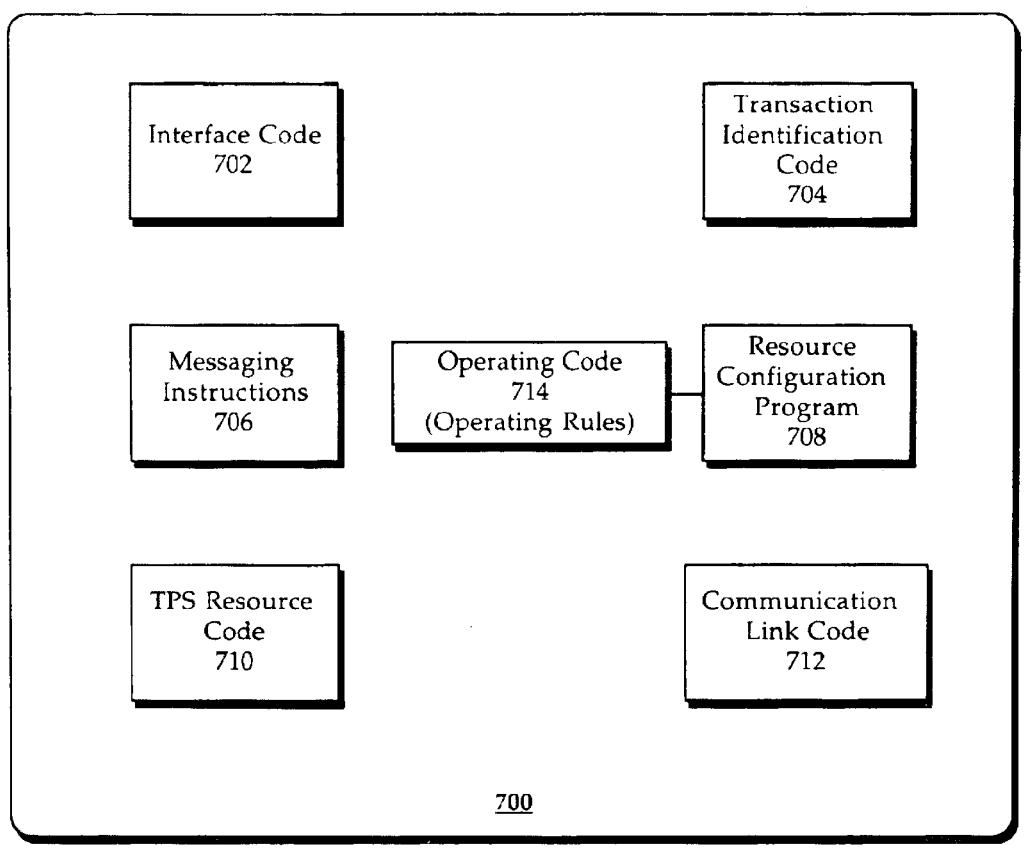
FIG. 7 illustrates an embodiment of a machine-readable medium in accordance with the teachings of one embodiment of the present invention.

FIG. 7 illustrates an embodiment of a machine-readable medium 700 containing various sets of instructions, code sequences, configuration information, and other data used by a computer or other machine processing device. The embodiment of the machine-readable medium 700, illustrated in FIG. 7, is suitable for use with the transactional service system 200 described above. The various information stored on medium 700 is used to perform various data processing operations. Machine-readable medium 700 is also referred to as a computer-readable or processor-readable medium. Machine-readable medium 700 can be any type of magnetic, optical, or electrical storage medium including a diskette, magnetic tape, CD-ROM, memory device, or other storage medium or carrier-wave signal.

Machine-readable medium 700 includes interface code 702 that controls the flow of information between various devices or components within the transactional service system 200. Interface code 702 may control the transfer of information within a device, or between an input/output port and a storage device. Additionally, interface code 702 may control the transfer of information from one device to another (e.g., the transfer of data or information between the transaction handler and the transactional routing controller and/or the transfer of data or information between the transactional routing controller and each individual TPS or resource).

Machine-readable medium 700 also includes transaction identification code 704 to determine a transaction request associated with an incoming transaction. The transaction request of an incoming transaction identifies the type of subject matter that the incoming transaction is directed to, for instance, the transaction request could identify the transaction as corresponding to a technical matter, sales matter, delivery matter, information matter, or any other transaction type. Accordingly, the transaction identification code 704 can be configured to utilize an identifier associated with each incoming transaction, such as an ANI (Automatic Number Identification), DNIS (Dialed Number Information Service), TTS (Touch Tone Selection), source e-mail address, or other identifier associated with an incoming transaction, to determine the transaction request associated with each incoming transaction. As such, the transaction identification code 704 can readily determine the transaction request associated with each incoming transaction by comparing the identifier associated with an incoming transaction against identification data contained in the transaction identification code 704.

In response to the determination of the transaction request associated with a particular incoming transaction, messaging instructions 706, contained in the machine-readable medium 700 generates data message(s), based upon the transaction request or identifier associated with each incoming transaction.

The data message(s) are supplied to a resource configuration program 708, via interface code 702, for further processing. The resource configuration program 708 is also supplied with resource data from TPS resource code 710. The TPS resource code 710 supplies resource data, indicating the capabilities and real-time availability of individual resources associated with each individual TPS, or each resource, to the resource configuration program 708.

In another embodiment, any changes relating to the real-time availability or capabilities of resources associated with each individual TPS are automatically reflected in the resource configuration program 708.

The resource data supplied to the resource configuration program 708 from each TPS or resource may comprise information such as: the service capabilities associated with a resource; the current availability of resources to service incoming transactions; the qualifications of particular resource to service particular types of transactions; the minimum expected delay associated with a particular resource; specialized qualifications (i.e., excellent customer service ranking) of particular agents to service particular types of transactions; the number of transactions awaiting servicing in any transaction agents associated agent queue; identification information of resources; resource reservation time-out periods; and a variety of other desired or necessary resource information associated with any resource or TPS within the transactional service system.

Accordingly, the resource configuration program 708 determines which resource to assign to a particular incoming transaction in accordance with operating code 714, wherein the operating code 714 maintains a set of operating rules that assist in determining which qualified resource 210 should handle a particular transaction. The operating rules are designed to assist the resource configuration program 708 in determining which qualified resource should be designated to handle a particular transaction based upon user or system defined parameters which are used to construct the operating rules. As such, the operating rules may specify which qualified resource, out of a series of qualified resources, is to be employed to service a particular transaction, based upon user or system defined parameters which are embodied within the operating rules.

Further, in one embodiment, a log is maintained by operating code 714 which indicates the number of transaction that are currently being serviced, or waiting to be serviced, by each resource (i.e., workflow of each resource) contained in the transactional service system. As such, the operating rules may specify that the resource configuration program 708 take the number of transaction that are currently being serviced, or waiting to be serviced, by each resource (i.e., workflow of each resource), into account when determining which qualified resource is to be selected to service a particular transaction.

Since, the resource configuration program 708 receives resource data, through TPS resource code 710, associated with each individual TPS or resource within the transactional service system, the resource configuration program 708 possesses information as to service capabilities and real-time availability of each resource within the transactional service system 200, in addition to all general resource information associated with each TPS.

Accordingly, the resource configuration program 708 examines both the transaction request associated with each incoming transaction, in addition to the resource data received from each individual TPS or resource, in order to reserve or allocate the appropriate resource for a corresponding transaction. Accordingly, the resource configuration program 708 determines an appropriate resource, in accordance with the set of operating rules, capable of servicing the particular transaction based upon a correlation between the resource data and the transaction request associated with a particular transaction.

For instance, if the incoming transaction has a transaction request which corresponds to a technical type inquiry, the transaction identification code 704 will identify that the particular incoming transaction as directed to a technical transaction type. Accordingly, the resource configuration program 708 examines both the transaction request associated with each incoming transaction (i.e., technical transaction request) and the resource data received from each individual TPS in order to determine, in accordance with the set of operating rules, the appropriate resource to service the corresponding transaction. As such, the resource configuration program 708 determines which resource within the transactional service system possesses the qualifications to service an incoming transaction having a technical type transaction request. It is understood that an incoming transaction may have multiple transaction requests, wherein the resource configuration program 708 determines which resource would be most appropriate to service such a transaction.

Upon determining the appropriate resource to service a corresponding transaction, the resource configuration program 708 generates a reservation request (RR) in order to reserve that particular appropriate resource to service the corresponding transaction. Accordingly, the reservation request (RR), which identifies the particular appropriate resource, is supplied to the TPS resource code 710 to reserve the particular appropriate resource.

After the reservation request (RR) has been supplied to the TPS resource code 710, thereby identifying the particular appropriate resource to the TPS, the TPS resource code 710 generates a reservation request response (RRR) indicating whether or not the particular appropriate resource has been reserved to service the particular corresponding transaction.

Provided the selected appropriate resource is available to service the particular transaction, the TPS resource code 710 will generate a reservation request response (RRR) indicating that the resource has been reserved (acknowledge signal) to service the particular corresponding transaction. Accordingly, the reservation request response (RRR) indicating that the resource has been reserved (acknowledge signal) is supplied back to the resource configuration program 708.

In response to the reservation request response (RRR) indicating that the resource has been reserved (acknowledge signal), the resource configuration program 708 generates a routing message, via messaging instructions 766, indicating that a specific/appropriate resource (identified in the reservation request response (RRR)) has been reserved to service the corresponding transaction.

Accordingly, the routing message is supplied to communication link code 712 which generates instructions to build a communication link, such as a telephone line or data link, directly to the identified reserved resource.

Alternately, if the selected appropriate resource is not available to service the particular transaction, resource configuration program 708 receives a reservation request response (RRR), from TPS resource code 710, indicating that the resource has not been reserved (non-acknowledge signal).

Accordingly, if the resource configuration program 708 receives a reservation request response (RRR) indicating that the resource has not been reserved (non-acknowledge signal), the resource configuration program 708 proceeds to determine an alternate resource which is best suited or most appropriate to handle a particular incoming transaction.

Upon determining an alternate resource, the resource configuration program 708 generates a reservation request (RR) in order to reserve that particular alternate resource to service the corresponding transaction.

Provided that the selected alternate resource is available to service the particular transaction, the TPS resource code 710 will generate a reservation request response (RRR), which is supplied to resource configuration program 708, indicating that the alternate resource has been reserved (acknowledge signal) in order to service the particular corresponding transaction.

Upon receiving reservation request response (RRR) indicating that the alternate resource has been reserved (acknowledge signal), the resource configuration program 708 generate a routing message, via messaging instructions 706, indicating that the specific alternate resource (indicated in the reservation request response (RRR)) has been reserved to service the corresponding transaction.

Accordingly, the routing message is supplied to communication link code 712 which generates instructions to build a communication link, such as a telephone line or data link, directly to the identified reserved resource.

Otherwise, if the selected appropriate resource is not available to service the particular transaction, a reservation request response (RRR) indicating that the resource has not been reserved (non-acknowledge signal) is generated and supplied to the resource configuration program 708.

Accordingly, the resource configuration program 708 will attempt to reserve another alternate resource or otherwise terminate the operation and generate a failure message. As such, the resource configuration program 708 may be configured to terminate the operation and generate a failure message after a specified number of attempts to reserve another alternate resource or upon the expiration of a specified time limit.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of routing a transaction from a customer, the method including:
   receiving a request identifier associated with the transaction, the request identifier being derived from the transaction from the customer;
   identifying an agent associated with a transactional processing system based upon the request identifier and agent data indicative of capabilities of agents associated with the transactional processing system;
   prior to routing the transaction to the identified agent, reserving the agent which has been identified; and
   routing the transaction to the identified agent wherein the agent generates a response to the transaction for communication to the customer.

2. The method of claim 1, including supplying the agent data and the request identifier to a transactional routing controller which reserves an agent based on the agent data and the request identifier in accordance with a set of operating rules associated with the transaction routing controller.

3. The method of claim 1, wherein the request identifier is derived from one of an Automatic Number Identifier (ANI), a Dialed Number Information Service (DNIS), a Touch Tone Selection (TTS) and an e-mail address of the transaction received from the customer.

4. The method of claim 3, including generating a data message in response to the request identifier, the data message identifying the nature of the transaction to the transactional routing controller.

5. The method of claim 1, which includes receiving the agent data from the transactional processing system, the agent data identifying the agent capabilities associated with each agent of the transactional processing system.

6. The method of claim 1, wherein identifying the agent includes:
   comparing the agent data associated with a plurality of transactional processing systems to the request identifier; and
   determining a correlation between the agent data and the request identifier; and
   routing the transaction to an appropriate transactional processing system in response to the correlation.

7. The method of claim 6, wherein determining the correlation between the agent data and the request identifier is determined in accordance with a set of associated operating rules.

8. The method of claim 1, which includes communicating a reservation response from the transactional processing system to a transactional routing controller to confirm that the agent has been reserved.

9. The method of claim 8, which includes generating a routing message based upon the reservation response, the routing message indicating the identity of the agent which has been reserved.

10. The method of claim 8, which includes supplying the transaction to the agent which has been reserved based upon the routing message.

11. The method of claim 1, wherein the transaction is supplied to a queue associated with the identified agent, the queue being configured to supply the transaction to the identified agent.

12. The method of claim 1, wherein the transaction is supplied to the transactional processing system which then supplies the transaction to the identified agent.

13. An apparatus to route a transaction from a customer, the apparatus including:
   a transaction handler to receive a transaction and generate a request identifier;
   a transactional routing controller to:
      receive the request identifier and agent data from at least one transactional processing system, the agent data being indicative of capabilities of agents associated with the transactional processing system and the request identifier being derived from the transaction from the customer;
      identify an appropriate agent associated with the transactional processing system based upon the agent data and the request identifier; and
      reserve the agent and, after the agent has been reserved, supply the transaction to the appropriate agent.

14. The apparatus of claim 13, wherein the request identifier is derived from one of an Automatic Number Identifier (ANI), a Dialed Number Information Service (DNIS), a Touch Tone Selection (TTS) and an e-mail address of the transaction received from the customer.

15. The apparatus of claim 14, wherein a data message is generated by the transaction handler to identify the nature of the transaction to the transactional routing controller.

16. The apparatus of claim 13, wherein the agent data from the transactional processing system identifies the agent capabilities associated with each agent of the transactional processing system.

17. The apparatus of claim 13, wherein the transactional routing controller compares the agent data and the request identifier to determine a correlation value between the agent data and the request identifier, the transactional routing controller using the correlation value to identify the appropriate agent associated with the transactional processing system to service the transaction.

18. The apparatus of claim 13, wherein the transactional processing system generates a signal confirming that the appropriate agent has been reserved.

19. The apparatus of claim 18, wherein the transactional processing system supplies a reservation response to the transactional routing controller to indicate that the appropriate agent has been reserved.

20. The apparatus of claim 19, wherein the transactional routing controller generates a routing message based upon the reservation response, the routing message identifying the agent which has been reserved.

21. The apparatus of claim 20, wherein the transaction handler supplies the transaction to the agent which has been reserved based upon the routing message.

22. The apparatus of claim 13, wherein the transaction handler supplies the transaction to a queue associated with the appropriate agent, the queue being configured to supply the transaction to the appropriate agent.

23. The apparatus of claim 13, wherein the transaction handler supplies the transaction to the transactional processing system which supplies the transaction to the appropriate agent.

24. An apparatus to route a transaction from a customer, the apparatus including:

first means for receiving a transaction and generating a request identifier derived from the transaction from the customer;

second means for:

receiving the request identifier and agent data from a third means;

identifying an appropriate agent associated with the third means, in accordance with associated operating rules, capable of servicing the transaction based upon the agent data and the request identifier; and reserving the agent and, after the agent has been reserved, supplying the transaction to the appropriate agent to generate a response for communication to the customer.

25. An apparatus to route a transaction from a customer, the apparatus including:

a transactional routing controller to receive a request identifier and agent data from a transactional processing system, the transactional routing controller identifying an appropriate agent associated with the transactional processing system which is capable of servicing the transaction based upon the agent data and the request identifier, the request identifier being derived from the transaction; and wherein the transactional routing controller reserves the agent and, after the agent has been reserved, supplies the transaction to the appropriate agent to generate a response for communication to the customer.

26. A machine-readable medium having stored thereon a sequence of instructions which, when executed by a machine, causes the machine to:

receive a request identifier associated with a transaction from a customer, the request identifier being derived from the transaction from the customer;

identify an agent associated with a transactional processing system based upon the request identifier and agent data indicative of capabilities of agents associated with the transactional processing system;

prior to routing the transaction to the identified agent, reserve the agent which has been identified; and route the transaction to the identified agent, wherein the agent generates a response to the transaction for communication to the customer.

27. The machine-readable medium of claim 26, wherein the medium supplies the agent data and the request identifier to a transactional routing controller.

28. The machine-readable medium of claim 26, wherein the request identifier is derived from one of an Automatic Number Identifier (ANI), a Dialed Number Information Service (DNIS), a Touch Tone Selection (TTS) and an e-mail address of the transaction received from the customer.

29. The machine-readable medium of claim 28, wherein a data message is generated in response to the request identifier, the data message identifying the nature of the transaction to a transactional routing controller.

30. The machine-readable medium of claim 26, wherein the agent data is supplied from the transactional processing system and identifies the agent capabilities associated with each agent of the transactional processing system.

31. The machine-readable medium of claim 26, wherein the medium compares the agent data and the request identifier to determine a correlation between the agent data and the request identifier in order to identify the agent capable of servicing the transaction.

32. The machine-readable medium of claim 26, wherein the determination of a correlation between the agent data and the request identifier is determined in accordance with a set of associated operating rules.

33. The machine-readable medium of claim 26, wherein the medium supplies a reservation response to a transactional routing controller indicating that the agent has been reserved.

34. The machine-readable medium of claim 33, wherein the medium generates a routing message based upon the reservation response, the routing message identifying the agent which has been reserved.

35. The machine-readable medium of claim 33, wherein the medium supplies the transaction to the agent which has been reserved based upon the routing message.

36. The machine-readable medium of claim 26, wherein the medium supplies the transaction to a queue associated with the identified agent, the queue being configured to supply the transaction to the identified agent.

37. The machine-readable medium of claim 26, wherein the medium supplies the transaction to the transactional processing system, the transactional processing system being configured to supply the transaction to the identified agent.

* * * * *